US009373338B1

(12) United States Patent
Gopalan et al.

(10) Patent No.: US 9,373,338 B1
(45) Date of Patent: Jun. 21, 2016

(54) ACOUSTIC ECHO CANCELLATION PROCESSING BASED ON FEEDBACK FROM SPEECH RECOGNIZER

(75) Inventors: Ramya Gopalan, Cupertino, CA (US); Kavitha Velusamy, San Jose, CA (US); Wai C. Chu, San Jose, CA (US); Amit S. Chhetri, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 517 days.

(21) Appl. No.: 13/532,649

(22) Filed: Jun. 25, 2012

(51) Int. Cl.
*G10L 21/02* (2013.01)
(52) U.S. Cl.
CPC .................................... *G10L 21/02* (2013.01)
(58) Field of Classification Search
CPC ..... G10L 21/0208; G10L 25/78; G10L 15/20; G10L 21/0232; G10L 19/005; G10L 15/22; G10L 15/30; G10L 15/265; G10L 15/07
USPC .......................................................... 704/226
See application file for complete search history.

(56) References Cited

U.S. PATENT DOCUMENTS

| | | | | |
|---|---|---|---|---|
| 4,905,288 A | * | 2/1990 | Gerson et al. .................. | 704/245 |
| 5,548,681 A | * | 8/1996 | Gleaves et al. ................ | 704/233 |
| 5,712,957 A | * | 1/1998 | Waibel et al. .................. | 704/240 |
| 5,842,168 A | * | 11/1998 | Miyazawa et al. ............ | 704/275 |
| 6,134,322 A | * | 10/2000 | Hoege et al. .............. | 379/406.08 |
| 6,415,257 B1 | * | 7/2002 | Junqua et al. .................. | 704/275 |
| 6,606,595 B1 | * | 8/2003 | Chengalvarayan et al. .......... | 704/256.5 |
| 6,725,193 B1 | * | 4/2004 | Makovicka ................... | 704/233 |
| 6,744,885 B1 | * | 6/2004 | Ketchum ................. | G10L 15/22 370/286 |
| 7,552,050 B2 | * | 6/2009 | Matsumoto et al. .......... | 704/233 |
| 7,684,559 B2 | * | 3/2010 | Hoshuyama ............. | 379/406.08 |
| 8,116,448 B2 | * | 2/2012 | Liu ......................... | 379/406.01 |
| 8,165,641 B2 | * | 4/2012 | Koike et al. .................... | 455/567 |
| 8,214,219 B2 | * | 7/2012 | Prieto et al. .................... | 704/275 |
| 8,234,120 B2 | * | 7/2012 | Agapi et al. ................... | 704/275 |
| 8,275,120 B2 | * | 9/2012 | Stokes, III ............... | H04B 3/23 379/392 |
| 8,340,975 B1 | * | 12/2012 | Rosenberger ................. | 704/275 |
| 8,406,415 B1 | * | 3/2013 | Lambert .................. | 379/406.02 |
| 8,650,029 B2 | * | 2/2014 | Thambiratnam et al. ..... | 704/233 |
| 8,855,295 B1 | * | 10/2014 | Chhetri et al. ........... | 379/406.03 |
| 2004/0220800 A1 | * | 11/2004 | Kong .................. | G10L 21/0208 704/205 |

(Continued)

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

*Primary Examiner* — Fariba Sirjani
(74) *Attorney, Agent, or Firm* — Lee & Hayes, PLLC

(57) ABSTRACT

An automatic speech recognition engine receives an acoustic-echo processed signal from an acoustic-echo processing (AEP) module, where said echo processed signal contains mainly the speech from the near-end talker. The automatic speech recognition engine analyzes the content of the acoustic-echo processed signal to determine whether words or keywords are present. Based upon the results of this analysis, the automatic speech recognition engine produces a value reflecting the likelihood that some words or keywords are detected. Said value is provided to the AEP module. Based upon the value, the AEP module determines if there is double talk and processes the incoming signals accordingly to enhance its performance.

27 Claims, 4 Drawing Sheets

(56) References Cited

U.S. PATENT DOCUMENTS

| | | | |
|---|---|---|---|
| 2005/0010410 A1* | 1/2005 | Takiguchi | G10L 15/20 704/243 |
| 2005/0080627 A1* | 4/2005 | Hennebert et al. | 704/270 |
| 2006/0136203 A1* | 6/2006 | Ichikawa | 704/226 |
| 2007/0198268 A1* | 8/2007 | Hennecke | 704/270 |
| 2007/0263848 A1* | 11/2007 | Sukkar | 379/406.01 |
| 2008/0071547 A1* | 3/2008 | Prieto et al. | 704/275 |
| 2008/0177534 A1* | 7/2008 | Wang | H04M 3/002 704/211 |
| 2008/0240370 A1* | 10/2008 | Wang | H04M 1/24 379/30 |
| 2010/0217604 A1* | 8/2010 | Baldwin | G06Q 30/02 704/275 |
| 2011/0112827 A1* | 5/2011 | Kennewick et al. | 704/9 |
| 2012/0221330 A1* | 8/2012 | Thambiratnam | G10L 25/84 704/235 |
| 2012/0223885 A1 | 9/2012 | Perez | |
| 2012/0288100 A1* | 11/2012 | Cho | 381/22 |
| 2013/0151248 A1* | 6/2013 | Baker, IV | G10L 25/51 704/228 |
| 2014/0214414 A1* | 7/2014 | Poliak | G10L 21/0208 704/228 |
| 2015/0279352 A1* | 10/2015 | Willett | G10L 15/30 704/231 |

* cited by examiner

ACOUSTIC ECHO CANCELLATION PROCESSING BASED ON FEEDBACK FROM SPEECH RECOGNIZER

BACKGROUND

In the field of voice communications, a communication device receives a far-end signal from a far-end talker typically over a network. The far-end signal is played via a loudspeaker of the communication device. A person who is co-located with a communication device is known as a "near-side talker." A near-side talker may be relatively far away from the microphones of the communication device, as compared to a distance of the loudspeaker from the microphones. Accordingly, sound played out of the loudspeaker (e.g., sound corresponding to the far-end signal) echoes and reaches the microphones, along with sound from the near-side talker. Double talk refers to a situation where sound from the near-side talker reaches the microphones simultaneously with sound from the far-end talker (e.g., from the loudspeaker).

Due to the sound from the loudspeaker reaching the microphones along with the sound from the near-side talker, during double talk, a near-to-far ratio may decrease, resulting in poor bi-directional communication performance of the communication device. The near-to-far ratio, or NFR, is the ratio of the power of the near-side talker with respect to the far-end talker.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
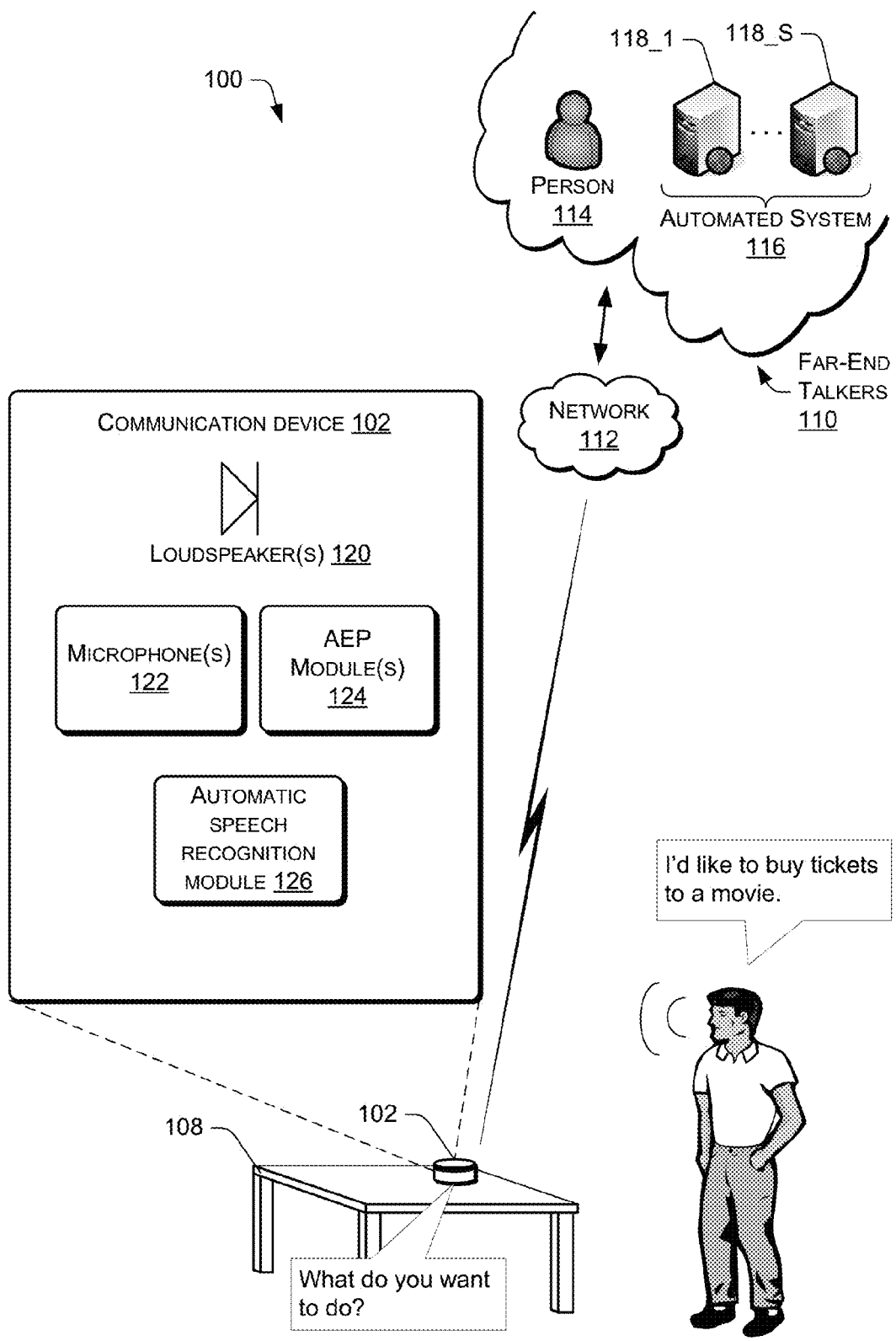
FIG. 1 shows schematic diagram of an illustrative environment that includes a communication device and a user of the communication device.

Described herein are techniques to improve acoustic performance of a communication device. The techniques include use of an acoustic-echo processing (AEP) module that processes signals to adjust and/or cancel components from the signals emitted from a speaker, such as voice sounds from a far-end talker, audio from a media source, etc., that may reach one or more microphones of the device. Thus, the AEP module is often referred to as an acoustic echo cancellation module since the purpose of the AEP module is to process signals in order to adjust and/or cancel components within the signal that can result in echo. The AEP module outputs an echo processed signal, which is fed into a speech recognizer to recognize its content, such as whether the content includes the near-side talker giving out some commands. The speech recognizer produces a confidence score when it detects certain keywords and that score is fed back to the AEP module to improve its performance, particularly during a double talk situation. Several embodiments and enhancements are described for this architecture having an AEP module that utilizes feedback from a speech recognizer.

In one embodiment, a communication device may comprise one or more loudspeakers and one or more microphones. The communication device may be, for example, a telephone handset, a headset, a smart phone, a conference phone, a cellular phone, a voice controlled assistant, or any appropriate consumer electronic device that is capable of producing sound from one or more loudspeakers and receiving sound from one or more microphones. For clarity, the present disclosure will be described with respect to only one loudspeaker and only one microphone. This is not meant to be limiting. In various implementations, there are multiple loudspeakers and an array of multiple microphones.

In one implementation, the loudspeaker may output sound from a far-end talker, from a media source (e.g., music or a video), etc. The microphone may receive sound from a near-side talker located proximally to the communication device. The microphone may also receive sound that is echoed from the loudspeaker. That is, the microphone may receive signals that include components from the near-side talker and also include components from a far-end talker via echo from the loudspeaker, resulting in double talk. This may decrease the near-to-far ratio, which is the ratio of the power of the near-side talker with respect to the far-end talker. Detecting a double talk scenario is important for echo cancellation processing since the adaptive filter of the AEP module should not adapt when there is a near-side talker present in the room. If the filter continues to adapt during double talk, the adaptive filter coefficients could diverge and in this event, the performance of the AEP module in canceling echo will degrade.

In an event where double talk is present within the communication device, an AEP module processes the signals in order to attempt to cancel out components of the signal that undesirably interfere with the primary portion or desired components of the signal. For example, the communication device may include a loudspeaker that is being utilized to produce sounds such as, for example, a far-end talker, music, signals from an audio or video source, and so forth. A user of the communication device may speak to the communication device through a microphone on the communication device. Thus, the user can function as a near-side talker. The user may issue a command to the device, e.g., "call Lynn," or the user may be using the communication device to speak with Lynn in such a way that Lynn's voice is coming from the loudspeaker and the user's voice is going into the microphone. If Lynn's voice and the user speak at the same time, the microphone will generally pick up sounds from the loudspeaker, as well as from the user's voice. This results in the occurrence of double talk. Since Lynn presumably wants to hear the user's voice as clearly as possible, then the AEP module will process the resulting signal in order to cancel out as much of Lynn's voice from the loudspeaker as possible.

In a situation where the user is speaking a command for the communication device, then the communication device wants to be able to discern the command. If the command arrives at the microphone at the same time as sound from the loudspeaker, the AEP module will process the resulting signal to cancel out as much of the sound from the loudspeaker as possible.

Since double talk can occur fairly regularly, it is helpful to predict when double talk will occur. Accordingly, in accordance with various embodiments of the present disclosure, an automatic speech recognition engine is included. The automatic speech recognition engine analyzes an acoustic-echo processed signal received from the AEP module and analyzes the signal to determine if certain content within the acoustic-echo processed signal is present. For example, the automatic speech recognition engine analyzes the acoustic-echo processed signal in order to determine if spoken words such as, commands are present. Thus, the automatic speech recognition engine may look for certain keywords. If the automatic speech recognition engine determines that certain content, such as, for example, spoken words or speech, is present within the acoustic-echo processed signal, the automatic speech recognition engine assigns a value, generally between zero and one. It is further assumed that a value of 0 implies that no target keywords are detected, while a value of 1 implies that some target keywords are detected; intermediate values between 0 and 1 reflects the confidence of the detection. In accordance with various embodiments, if speech is detected, then the value is one and is provided or fed back to the AEP module.

The AEP module utilizes this value in order to enhance acoustic-echo cancellation processing of future signals. The value indicates to the AEP module that there is a high likelihood of double talk, i.e. signals will include a component from a near-side talker, in the near future due to the determined presence of desirable content, i.e. speech from a near-side talker, by the automatic speech recognition engine. The value provided by the automatic speech recognition engine can be utilized to facilitate processing of signals by the AEP module by slowing down or halting adjustments to the adaptive filter. Additionally, control parameters of the communication device such as, for example, volume and/or a frequency of the audio that goes to the loudspeaker, can be adjusted. The purpose of the adaptive filter within the AEP module is to cancel the echo that is originated from the far-end.

The techniques and systems described herein may be implemented in a number of ways. Example implementations are provided below with reference to the following figures.

Illustrative Environment and System

FIG. 1 shows an illustrative architecture 100, set in an exemplary environment, which includes a communication device 102 and a user 104 of the communication device 102. Although only one user 104 is illustrated in FIG. 1, in an embodiment, multiple users may use the communication device 102. In an embodiment, the user 104 may be located proximally to the communication device 102.

The communication device 104 may be implemented in any number of ways. It may be a telephone handset, a headset, a phone, a portable phone, a tablet or computing device, or any number of electronic devices that is capable of producing sound from a speaker and receiving sound in one or more microphones. In this illustration, the communication device 104 is implemented as an electronic voice controlled assistant physically positioned on a table 108 within the environment (e.g., a room, hall, office, etc.). In other implementations, it may be placed in any number of locations (e.g., ceiling, wall, in a lamp, beneath a table, on a work desk, in a hall, under a chair, etc.). The device 104 is shown communicatively coupled to far-end talkers 110 over a network 112. The far-end talkers 110 may include individual people, such as person 114, or automated systems 116 that verbally interact with the user 106. The automated system 116 is shown hosted on one or more servers 118_1, . . . , 118_S.

The communication device 102 may include a loudspeaker 120 and a microphone 122. As previously noted, the communication device 102 may comprise one or more loudspeakers 120 and one or more microphones 122. For clarity, the present disclosure is described with respect to only one loudspeaker 120 and only one microphone 122. This is not meant to be limiting.

The loudspeaker 120 may be configured to output sound waves produced by the communication device 102. The sound may be generated based on information stored in the communication device 102 and/or information otherwise received by the communication device 102 from an appropriate source, such as far-end talkers 110. The loudspeaker 120 may be configured to operate in a loudspeaker mode, where sound waves produced by the loudspeaker 120 reach the user 104 and also the microphone 122.

The microphone 122 may receive sound from the user 104 or other sources in the environment. The microphone 122 may also receive sound produced and/or echoed from the loudspeaker 120. Thus, the microphone 122 may receive sound from both the user 104 and also receive sound produced by the loudspeaker 120. The microphone 122 may also receive sound from other sound sources placed proximally to the communication device 102.

In this embodiment, the loudspeaker 120 outputs sound from a far-end talker 110, and the user 104 is a near-side talker for the communication device 102. Thus, the microphone 122 may receive sound from both the near-side talker 104 and the far-end talker 110. A near-to-far ratio refers to a ratio of power from the near-side talker and sound energy from the far-end talker, as detected by the microphone 122 of the communication device 102.

During double talk, the microphone 122 may simultaneously receive sound from the near-side talker (e.g., from the user 104) and from the far-end talker 110 (e.g., via echo from the loudspeaker 120). For the far-end talker to clearly listen to the near-side talker, during double talk, it may be desirable to cancel and/or attenuate echo from the loudspeaker 120 and enhance sound from the near-side talker in the signals detected by the communication device 102.

Accordingly, the communication device 102 may also include an AEP module 124 and an automatic speech recognition engine 126. The AEP module 124 is often referred to as an acoustic echo cancellation module since the purpose of the AEP module is to process signals in order to adjust and/or cancel components within the signal that can result in echo. In other embodiments and not illustrated in FIG. 1, the communication device 102 may include multiple AEP modules 124 and multiple automatic speech recognition engines 126. The AEP module 124 may be configured to process a signal received at a microphone 122, where the signal includes a component from the loudspeaker 120. The AEP module 124 attempts to substantially cancel the component of the signal received from the loudspeaker 120 to reduce double talk. The automatic speech recognition engine 126 may be configured to receive an acoustic-echo processed signal from the AEP module 124 and determine content within the acoustic-echo processed signal. Based on what content is discovered, the automatic speech recognition engine 126 produces a value corresponding to a speech recognition confidence and provides that value to the AEP module 124. The AEP module 124 adjusts how it processes the signal received at the microphone 122 according to the value received.

Figure 2:
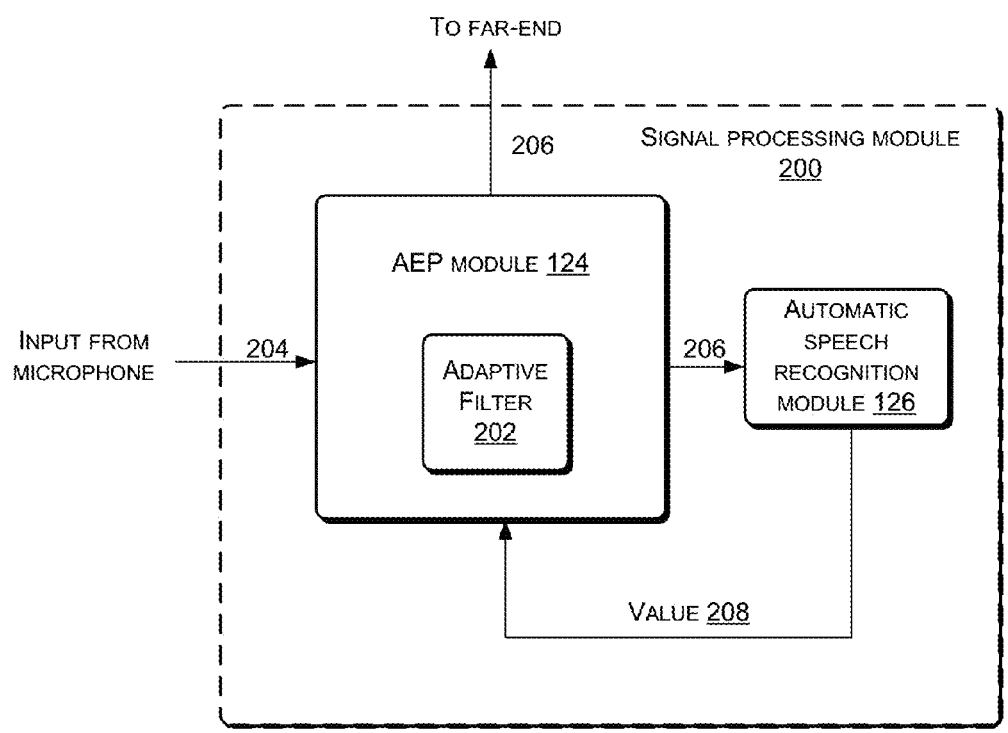
FIG. 2 illustrates a signal processing module, which includes an acoustic-echo processing module and an automatic speech recognition engine, of the communication device of FIG. 1.

FIG. 2 illustrates a signal processing module 200 that includes the AEP module 124 and the automatic speech recognition engine 126. The signal processing module 200 can be implemented in a single apparatus, e.g., a single semiconductor device, or in multiple apparatuses, e.g., multiple semiconductor devices. Additionally, one or more of the apparatuses that make up the signal processing module 200, including the AEP module 124 and/or the automatic speech recognition engine 126, may be located remotely from the communication device 102. For example, one or more of the apparatuses that make up the signal processing module 200, including the AEP module 124 and/or the automatic speech recognition engine 126, may be located in a computing device, in a network-accessible computing platform, etc.

In an embodiment, the AEP module 124 comprises an adaptive filter 202. The signal processing module 200 receives a signal 204 from the microphone 122 where the content of the signal may include one or more "desirable" components from a near-side signal (i.e. components from the user 104) and one or more "undesirable" components from the loudspeaker 120 (or some other source). The adaptive filter 202 adaptively filters this signal to substantially cancel or remove the undesirable components or elements of this signal. Generally, most or all components or elements of a near-side signal are desirable, while most or all components or elements from the loudspeaker 120 (or some other source) are undesirable. Coefficients of the adaptive filter 202 may be adapted dynamically to capture the undesired components from the loudspeaker 120 and cancel those components from the input of the microphone 122.

In an embodiment, the AEP module 124 provides acoustic-echo processed signals 206 to a far-end speaker for output to a far-end talker (illustrated in FIG. 2 as "TO FAR-END"). In accordance with various embodiments, the automatic speech recognition engine 126 also receives the acoustic-echo processed signals 206 from the AEP module 124 and analyzes the acoustic-echo processed signals 206 to determine if desirable content is present within the acoustic-echo processed signals 206. For example, the automatic speech recognition engine 126 analyzes the acoustic-echo processed signals 206 in order to determine if speech from a user 104 such as, for example, general speech, a command or a key word, is present. If such speech is determined to be present, the automatic speech recognition engine 126 assigns a value 208, generally between zero and one. In accordance with an embodiment, if speech is detected, then the value 208 is one and is provided or fed back to the AEP module 124.

Figure 3A:
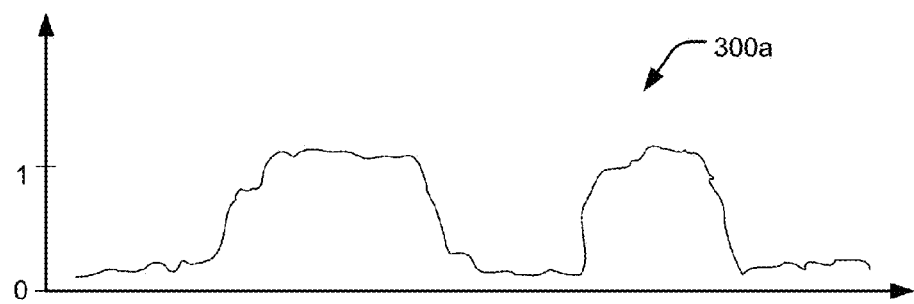
FIGS. 3A and 3B are graphs illustrating waveforms of scores from the automatic speech recognition engine of FIG. 2.
Figure 3B:
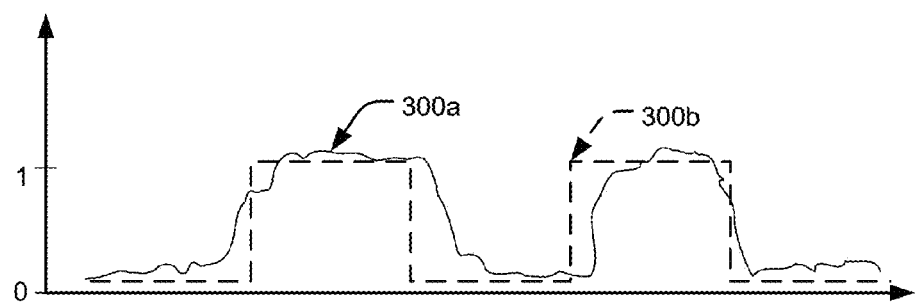

FIG. 3A shows a waveform 300a of scores produced by the automatic speech recognition engine 126. Measured scores are generally between zero and one (but can be in other ranges depending upon the configuration of the automatic speech recognition engine 126). As can be seen, the waveform 300a includes high points and low points, or "peaks and valleys." It would be preferable if the automatic speech recognition engine 126 could simply ascertain if speech is present and simply assign a zero or a one, with one indicating that yes, speech or a keyword has been detected. However, this is not the case generally. Thus, a range of scores may be assigned to indicate a likelihood of speech being present. For example, if the scores are between 0.6 and one, then the automatic speech recognition engine can assign a value 208 of one, while scores below 0.6 can result in a value 208 of zero being assigned. Thus, the wave form 300a can be adjusted to a digital type of format where the values are either zero or one as illustrated in FIG. 3B and represented by waveform 300b. Other types of scoring and values may be used if desired.

In accordance with an embodiment, a value 208 of one indicates to the AEP module 124 that there is a high likelihood of double talk, i.e. signals will include a component from a near-side talker, in the near future due to the determined presence of desirable content within an acoustic-echo processed signal 206, i.e. speech from the user 104, by the automatic speech recognition engine 126. The AEP module 124 can therefore use the value 208 to facilitate acoustic-echo cancellation processing of signals 204. The AEP module 124 utilizes this value 208 in order to enhance acoustic-echo cancellation processing of future signals. The value 208 indicates to the AEP module 124 that there is a high likelihood of double talk, i.e. signals will include a component from a near-side talker, in the near future due to the determined presence of desirable content, i.e. speech from a near-side talker such as user 104, by the automatic speech recognition engine 126. The value 208 provided by the automatic speech recognition engine 126 can be utilized to facilitate processing of signals by the AEP module 124 by adjusting various control parameters of the AEP module 124 such as, for example, by slowing down or halting adjustments to the adaptive filter 202. The purpose of the adaptive filter 202 within the AEP module 124 is to cancel the echo that is originated from the far-end. Additionally, volume and/or a frequency of the audio that goes to the loudspeaker 120 can be adjusted.

Illustrative Operations

Figure 4:
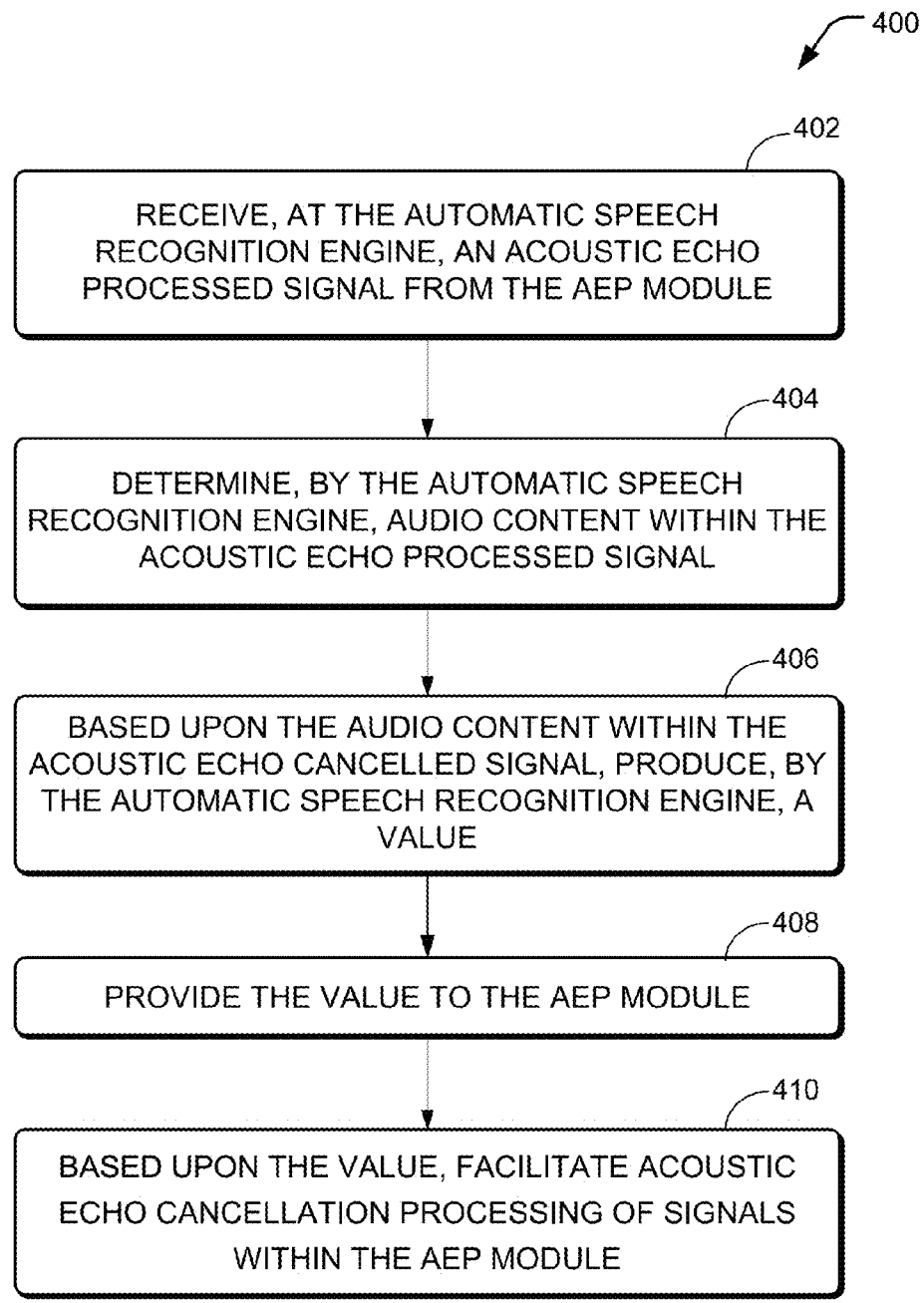
FIG. 4 is a flow diagram of an illustrative process to operate a communication device.

FIG. 4 is a flow diagram of an illustrative process 400 to operate a communication device. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. The process 400 is described with reference to the implementations discussed above with respect to FIGS. 1-3, although the process may be implemented using other devices and system architectures.

At 402, the automatic speech recognition engine 126 receives an acoustic-echo processed signal 206 from the AEP module 124. At 404, the automatic speech recognition engine 126 determines audio content within the acoustic-echo processed signal 206. At 406, based upon the audio content within the acoustic-echo processed signal, the automatic speech recognition engine 126 produces a value. At 408, the value is provided to the AEP module 124. At 410, based upon the value, acoustic-echo cancellation processing of signals 204 within the AEP module 124 is facilitated.

As previously discussed, a value 208 of one indicates to the AEP module 124 that there is a high likelihood of double talk, i.e. signals will include a component from a near-side talker, in the near future due to the determined presence of desirable content within an acoustic-echo processed signal 206, i.e. speech from the user 104, by the automatic speech recognition engine 126. The AEP module 124 can therefore use the value 208 to facilitate acoustic-echo cancellation processing of signals 204. The AEP module 124 utilizes this value 208 in order to enhance acoustic-echo cancellation processing of future signals. The value 208 indicates to the AEP module 124 that there is a high likelihood of double talk, i.e. signals will include a component from a near-side talker, in the near future due to the determined presence of desirable content, i.e. speech from a near-side talker such as user 104, by the automatic speech recognition engine. The value 208 provided by the automatic speech recognition engine 126 can be utilized to facilitate processing of signals by the AEP module 124 by slowing down or halting adjustments to the adaptive filter 202. The purpose of the adaptive filter 202 within the AEC module 124 is to cancel the echo that is originated from the far-end. Additionally, volume and/or a frequency of the audio that goes to the loudspeaker 120 can be adjusted.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method of processing signals within an apparatus comprising an acoustic-echo processing module, an automatic speech recognition engine, a loudspeaker and at least one microphone, the method comprising:
receiving, at the automatic speech recognition engine from the acoustic-echo processing module, an acoustic-echo processed signal, wherein the acoustic-echo processed signal is based at least in part upon processing a first signal received at the microphone that comprises a component from the loudspeaker, the processing to cancel at least a portion of the component from the first signal;
determining, by the automatic speech recognition engine, audio content within the acoustic-echo processed signal;
based at least in part upon the audio content determined to be within the acoustic-echo processed signal, producing, by the automatic speech recognition engine, a value indicative of a confidence that one or more spoken commands are present in the audio content;
determining that the value exceeds a threshold value;
providing the value to the acoustic-echo processing module;
adjusting one or more control parameters of the acoustic-echo processing module based on the value; and
processing a subsequent signal received by the acoustic-echo processing module, the processing comprising canceling at least a portion of a component from the loudspeaker corresponding to the subsequent signal.

2. The method of claim 1, wherein processing of the subsequent signal by the acoustic-echo processing module comprises indicating a confidence that further signals will comprise an element from the user.

3. The method of claim 1, wherein processing of the subsequent signal by the acoustic-echo processing module comprises applying a filter to adjust at least one of a volume and/or a frequency on an audio signal output to the loudspeaker.

4. The method of claim 1, wherein processing of the subsequent signal by the acoustic-echo processing module comprises adjusting a rate of adaptation of an adaptive filter within the acoustic-echo processing module.

5. The method of claim 1, wherein determining, by the automatic speech recognition engine, audio content within the acoustic-echo processed signal comprises determining that one of a plurality of key words is present within the acoustic-echo processed signal.

6. The method of claim 5, wherein processing of the subsequent signal by the acoustic-echo processing module comprises, based upon the determining that one of a plurality of key words is present, indicating a confidence that the subsequent signal includes an element from the user and that further signals will include an element from the user.

7. The method of claim 1, wherein steps of the method are performed repeatedly.

8. The method of claim 1, wherein the value indicates to the acoustic-echo processing module a confidence that future signals will comprise an element from the user.

9. A device comprising:
an acoustic-echo processing module configured to process a first signal received at a microphone of the device to cancel, at least in part, a component of the first signal corresponding to audio from a loudspeaker of the device, and to output an acoustic-echo processed signal;
an automatic speech recognition engine configured to:
receive the acoustic-echo processed signal from the acoustic-echo processing module,
determine content corresponding to audio in the acoustic-echo processed signal,
based at least in part upon the content determined to be within the acoustic-echo processed signal, determine a value indicative of a confidence that one or more spoken commands are present in the content,
determine that the value exceeds a threshold, and
provide the value to the acoustic-echo processing module;
wherein the acoustic-echo processing module is further configured to:
adjust one or more control parameters of the acoustic-echo processing module based on the value, and
adjust a subsequent signal received at the microphone to cancel, at least in part, a component of the subsequent signal corresponding to audio from the loudspeaker of the device.

10. The device of claim 9, wherein the value indicates to the acoustic-echo processing module a confidence that future signals will comprise an element from a user.

11. The device of claim 9, wherein the acoustic-echo processing module is configured to adjust the subsequent signal by applying a filter to adjust at least one of a volume and/or a frequency on an audio signal output to the loudspeaker.

12. The device of claim 9, wherein the acoustic-echo processing module is configured to adjust the subsequent signal by adjusting a rate of adaptation of an adaptive filter within the acoustic-echo processing module.

13. The device of claim 9, wherein the automatic speech recognition engine is configured to determine content corresponding to audio in the acoustic-echo processed signal by determining that one of a plurality of key words is present within the acoustic-echo processed signal.

14. The device of claim 13, wherein the automatic speech recognition engine is further configured to, based upon determination that one of a plurality of key words is present, produce the value to thereby indicate a confidence that the subsequent signal includes an element from a user and that further signals will include an element from the user.

15. The device of claim 9, wherein the device is included within a communication device.

16. An apparatus comprising:
one or more processors; and
memory accessible by the one or more processors, the memory including instructions that, when executed, cause the one or more processors to:
determine audio content within an acoustic-echo processed signal, wherein the acoustic-echo processed signal is at least based upon processing a first signal received at a microphone that comprises a component from a loudspeaker, the processing to cancel at least a portion of the component from the first signal,
based at least in part upon the audio content determined to be within the acoustic-echo processed signal, produce a value indicative of a confidence that one or more spoken commands are present in the audio content, determine that the value exceeds a threshold value, adjust one or more control parameters of the apparatus based on the value, and process a subsequent signal received by the microphone, the processing comprising canceling at least a portion of a component from the loudspeaker corresponding to the subsequent signal.

17. The apparatus of claim 16, wherein the instructions cause the one or more processors to process the subsequent signal by indicating a confidence that future signals will comprise an element from a user.

18. The apparatus of claim 16, wherein the instructions cause the one or more processors to process the subsequent signal by applying a filter to adjust at least one of a volume and/or a frequency of an audio signal output to the loudspeaker.

19. The apparatus of claim 16, wherein the instructions cause the one or more processors to process the subsequent signal by adjusting a rate of adaptation of an adaptive filter within the acoustic-echo processing module.

20. The apparatus of claim 16, wherein the instructions cause the one or more processors to determine content within the acoustic-echo processed signal by determining that one of a plurality of key words is present within the acoustic-echo processed signal.

21. The apparatus of claim 20, wherein the instructions cause the one or more processors to process the subsequent signal by, based upon the determining that one of a plurality of key words is present, indicating a confidence that the subsequent signal includes an element from the user and that future signals will include an element from the user.

22. A communication device comprising:
a loudspeaker;
a microphone; and
a signal processing module comprising:
an acoustic-echo processing module, wherein the acoustic-echo processing module is configured to process a first signal received at the microphone to cancel, at least in part, a component of the first signal received from a loudspeaker and to output an acoustic-echo processed signal;
an automatic speech recognition engine, wherein the automatic speech recognition engine is configured to:
receive the acoustic-echo processed signal from the acoustic-echo processing module, determine content corresponding to audio in the acoustic-echo processed signal, based at least in part upon the content determined to be within the acoustic-echo processed signal, determine a value indicative of a confidence that one or more spoken commands are present in the content, determine that the value exceeds a threshold value, and provide the value to the acoustic-echo processing module;

wherein the acoustic-echo processing module is further configured to:

adjust one or more control parameters of the acoustic-echo processing module based on the value, and adjust a subsequent signal received at the microphone to cancel, at least in part, a component of the subsequent signal corresponding to audio from the loudspeaker of the device.

23. The communication device of claim 22, wherein the value indicates to the acoustic-echo processing module a confidence that future signals will comprise an element from a user.

24. The communication device of claim 22, wherein the acoustic-echo processing module is configured to adjust the subsequent signal by applying a filter to adjust at least one of a volume and/or a frequency on an audio signal output to the loudspeaker.

25. The communication device of claim 22, wherein the acoustic-echo processing module is configured to adjust the subsequent signal by adjusting a rate of adaptation of an adaptive filter within the acoustic-echo processing module.

26. The communication device of claim 22, wherein the automatic speech recognition engine is configured to determine content corresponding to audio in the acoustic-echo processed signal by determining that one of a plurality of key words is present within the acoustic-echo processed signal.

27. The communication device of claim 26, wherein the automatic speech recognition engine is further configured to, based upon determination that one of a plurality of key words is present, produce the value to thereby indicate a confidence that the subsequent signal includes an element from a user and that future signals will include an element from the user.

* * * * *